United States Patent [19]
Lewis

[11] 3,843,151
[45] Oct. 22, 1974

[54] PARTICLE ENGAGING SCREEN DEVICE FOR PYRO-TECHNIC SYSTEM
[75] Inventor: Donald J. Lewis, Troy, Mich.
[73] Assignee: Allied Chemical Corporation, New York, N.Y.
[22] Filed: Apr. 10, 1972
[21] Appl. No.: 242,630

[52] U.S. Cl. ........................................ 280/150 AB
[51] Int. Cl. ............................................. B60r 21/08
[58] Field of Search ............................... 280/150 AB

[56] References Cited
UNITED STATES PATENTS
3,425,712  2/1969  Berryman ..................... 280/150 AB
3,473,824  10/1969  Carey et al. ................... 280/150 AB
3,527,472  9/1970  Chute et al. .................... 280/150 AB
3,618,976  11/1971  Leising .......................... 280/150 AB
3,618,981  11/1971  Leising .......................... 280/150 AB
3,638,755  2/1972  Sack .............................. 280/150 AB
3,666,289  5/1972  Magyar .......................... 280/150 AB Primary Examiner—David Schonberg
Assistant Examiner—John P. Silverstrim
Attorney, Agent, or Firm—Jonathan Plaut; John P. Kirby, Jr.

[57] ABSTRACT

Entrapment of heat-carrying particles from a pyrotechnic burn on a screen device located within an air cushion.

6 Claims, 2 Drawing Figures

PARTICLE ENGAGING SCREEN DEVICE FOR PYRO-TECHNIC SYSTEM

This invention relates to entrapment of heat-carrying particles from a pyro-technic burn on a screen device located within an air cushion. More particularly, this invention relates to the inclusion within an air cushion device, independently of or as a part of the gas generating manifold, of a screen device which traps heat-carrying particles from the burn of the gas generation before they reach the inside surface of the air cushion, in order to substantially eliminate excessive heat transfer to the air cushion and the environment there around. In one specific embodiment, the screen device is in the form of a mesh bag surrounding the outlet end of the gas generator and contained within the air cushion to be inflated. That mesh bag may cooperate with a sound reducing screen within said air cushion.

BACKGROUND OF THE INVENTION

Because of increased interest in automobile safety and passive restraint systems for the protection of the driver or passenger of an automobile, inflatable air cushion assemblies have become well known in the art. Such inflatable air cushion assemblies are in all cases comprised of a gas supply and an air bag or cushion to which the gas is delivered for inflation thereof to protect the passenger or driver. In most cases a manifold or distribution device in the form of, for example, a cylinder, directs the gas from the source of supply into the air bag. The source of supply is either (1) a stored gas, such as an inert gas, for example, nitrogen, under pressure, or (2) a stored gas augmented by a gas producing substance as the result of a burn of the substance, or (3) purely a gas producing substance, with no stored gas combined. An example of an augmented system is found in U.S. Pat. application Ser. No. 81,947, filed 10,19,70 now U.S. Pat. No. 3,674,059. An example of purely a gas producer as a result of a burn is found in U.S. Pat. application Ser. No. 147,913, filed May 28, 1971, now U.S. Pat. No. 3,787,074.

In the case where a burn of a substance (a combustible) is used either to augment stored gas under pressure or as the sole supply of gas for the air bag, the burn of the powder or combustible substance, which may be in the form of a grain, or may be compacted for example under pressure, will be at elevated temperature and produce gas often at a temperature of about 1600° to 2000°F. or higher. In addition, as a result of the burn of the combustible substance, certain impurities in the substance or after products of the burn are released with the gas into the air cushion and carry heat therewith to the inner surface of the air cushion, thus resulting in the heat up of the air cushion itself and the environment surrounding the air cushion, especially if the bag is porous.

This carrying of the particles and heat to the air cushion is deleterious since the bag may be thus scorched, and the heat may be transferred to the environment surrounding the cushion. However, it is beneficial to carry some heat into the air cushion so that the gas found in the cushion will continue to expand and be expanded and thus the bag will remain fully inflated for the required time for protection of the occupant with a lower total gas flow than otherwise.

It has further been found to be extremely valuable to include within the air cushion assembly a sound reducing screen within a particular range of distance from the gas generator to break up the sound wave of the gas emerging into the air cushion and thus significantly reduce sound levels. The combination of the screen device of this invention with such a sound reducing screen produces particular benefit.

BRIEF DESCRIPTION OF INVENTION

In order to meet the needs described above, heat-carrying particles from a pyro-technic burn are entrapped before they reach the inner surface of the air cushion being inflated by the gas generator. If such particles reach the inner surface of said cushion, then they carry heat to said inner surface (they are of a temperature of about 600° to 700°F. or higher when they reach said surface); and in the use of a porous bag especially, the heat is then carried through the bag to the environment surrounding the bag.

In one particular embodiment, the invention concerns placing a fine mesh screen device outside of the generator and in the direction of the flow of the gas flowing into the bag. The screening device traps any particles or impurities which are directed into the bag as a result of the burn and does not allow them to reach the inner surface of the bag. It is especially advantageous to place a sound reducing bag or screen around this particle collecting screen, as then the two barriers act in cooperation to reduce heat, particles moving into the bag, and sound abatement.

The screening device, which intercepts the particles of the burn may be a wire mesh screen bag, or a porous pipe or cylinder, or of other design such as to intercept particles by allowing generated gas to penetrate therethrough. It is especially advantageous to make the manifold itself porous, as will be described. The collection of the particles on the interior surface of the screening device will aid in the continued supply of heat into the bag to be inflated.

DETAILED DESCRIPTION OF THE INVENTION

Figure 1:
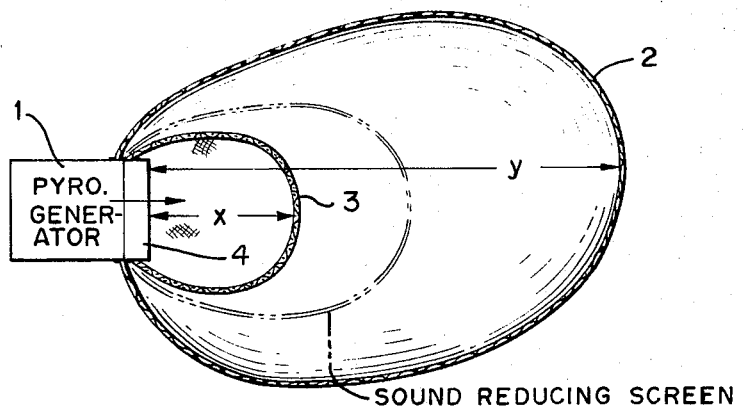
FIG. 1 of the drawing shows in schematic form a screen device of the invention in position about the generator and within the air cushion device.

Referring to FIG. 1 of the drawing, in one embodiment of the invention a pyro-technic generator 1 supplies gas to inflate an air cushion bag 2. The generator may be mounted, for example, in any convenient position in the automobile, not shown, so as to inflate the air cushion in a position to protect an occupant (not shown) be he driver or passenger. The pyro-technic generator may be used either alone to inflate the air cushion or to augment a stored gas system, as previously discussed.

Gas emitting from the pyro-technic generator will be of an elevated temperature and will contain impurities, including reaction particles of the burn of the gas producing material, for example, carbon black. The temperature of the generated gas may be in the range of about 500°F., or higher and the particles resulting from the reaction, and also those resulting as a result of incomplete burn, may be of a temperature in the range of about 700° to 800°F., or higher, as discussed. Movement of these particles to the inside surface of the bag 2 results in a heating and in some cases scorching of the bag, which is obviously undesirable. Furthermore, in both porous and non-porous bags, but especially in porous bags, lodging of the particles on the inside surface of the bag causes a heating of the environment immediately surrounding the outside of the bag as the gas passes therethrough, which is undesirable because of its possible effect on the comfort of the occupant.

Figure 2:
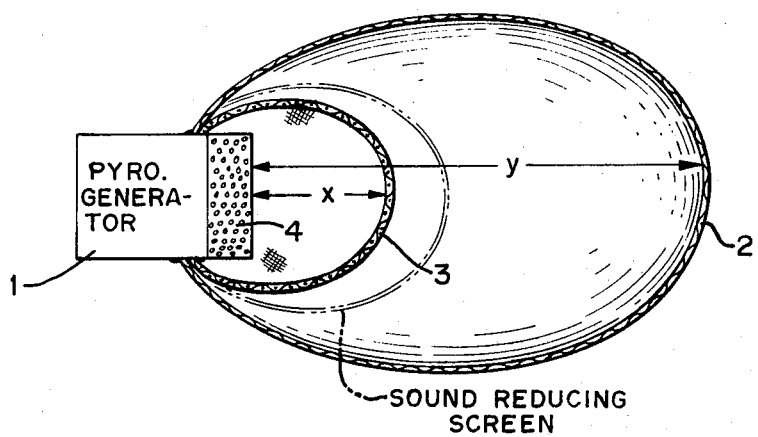
FIG. 2 of the drawing shows a second embodiment of the invention.

Placed within the bag 2, according to the invention in one embodiment, is a particle screen device 3 comprised of a metal screen of, for example 100 mesh, which allows the gas to pass therethrough into the bag, without allowing the impurities to reach the inner surface of the bag. The screen device traps said impurities but keeps them within the environment of the air cushion with the generated gas passing therethrough so as to maintain the heat necessary in the air cushion for full inflation of the air cushion. The screen or trapping device should be located at such a distance so that condensation of vapor and liquid impurities into said particles has already occurred. Thus the heat of condensation will not have to be withstood by the bag and maximum number of particles will be collected. Referring to FIGS. 1 and 2, the dimension "x" extends from the last structure of the generating source (that is, from the right side of pyro-technic generator 1) to the outermost point of the particle screen device 3 from the generating source, that is, the point on the particle screen device 3 spaced furthest apart from the generating source (pyro-technic generator 1). The dimension y extends from the last structure of the generating source (that is, from the right side of pyro-technic generator 1) to the outermost point on the air cushion bag 2 from the generating source (pyro-technic generator 1), that is, the point on the air cushion bag 2 spaced furthest apart from the generating source (pyro-technic generator 1). For maximum entrapment of the particles within the air cushion bag 2, but maintaining of them away from the inner surface of the air cushion bag 2, it is believed that the outermost point on the screen bag device 3 should be spaced apart in distance from the last structure of the generating source from which the gas emanates, such as the pyro-technic generator 1 in FIG. 1 or the manifold in FIG. 2, by $x/y$ from about 1½ percent to about 40 percent of the diameter across the air cushion bag 2 when inflated. In a 30 inch diameter for the air cushion bag 2 (when inflated) the particle screen device 3 is most advantageously about 1 to 2 inches from the last structure of the generating source.

The bag may be made of other materials besides wire mesh, such as a fibered glass, asbestos, nylon or other suitable plastic material. In a second embodiment, shown in FIG. 2, the manifold device 4 itself may be formed of a porous material which allows the gas to pass therethrough but maintains the particles in a position away from the inside of the bag. In one embodiment, the manifold 4 may be made specifically of a sintered stainless steel to allow such passage of gas and entrapment of heat-carrying particles. Furthermore, a bag screen of the type shown at 3 in FIG. 1 may be used in association with the porous manifold for additional protection.

Advantageously, a noise reducing screen may have been placed inside the bag, according to the invention as set forth in U.S. Pat. application Ser. No. 230,394, filed Feb. 29, 1972 now Pat. No. 3,799,575. When such noise reducing screen is employed, it is especially advantageous to include the impurity screen means of FIG. 1 or of FIG. 2, for example, within said noise reducing screen and thus within said inflatable bag. Such inclusion of the impurity screen means within the noise reducing screen results in a cooperation and an effect on noise and an effect on heat protection, as well as the elimination of particles or impurities within the bag, not found as a result of the use of either device alone.

The noise reduction screen provided as in said patent application results in a significant reduction of the noise level. The particle reducing screen results in the entrapment of the heat particles with the advantage of heating of the gas within the bag, without the particles reaching the inner surface of the bag, as discussed, and the sound reducing screen, shown in dotted lines as an optional feature in FIG. 1, serves to entrap any particles which escape the particle reducing screen and are moving towards the inner surface of the bag, thus providing for additional heat particle entrapment while resulting in the very beneficial sound reduction which is its primary function.

The limitations as to particular materials or as to temperatures found in the preceding description is, of course, for illustrative purposes and given with relation to specific embodiments. It is understood that the above-described example and general descriptive matter is merely illustrative of the invention and not meant to limit said invention, except as such invention is within the scope of the following claims.

I claim:

1. In an air cushion inflation apparatus including a gas generator made up at least partially of a pyrotechnic material which burns to produce a gas and an air bag to which said gas is directed, the improvement comprising: a gas impurity screen means interposed between said gas generator and said air bag, said gas impurity screen means being contained entirely within said bag, both before and after actuation of said inflation apparatus, and said gas impurity screen means being adapted to engage impurities, said gas impurity screen means being porous to the passing of said gas therethrough and into the bag for inflation thereof; and a manifold for distributing said gas to the inside of said air bag for inflation thereof, said manifold being made of porous metal and serving both for distribution of said gas as a result of its porosity and for entrapment of heat-carrying particles.

2. Apparatus as claimed in claim 1, and further comprising a sound reducing screen disposed within said air bag and surrounding said porous manifold to break up the sound waves of said gas entering the air bag and to catch any heat containing impurities passing through said porous manifold.

3. Apparatus as claimed in claim 1, said gas impurity screen means comprising a porous inner bag surrounding said porous manifold as a part of said screen means to engage impurities passing through the porous manifold but to allow gas to pass therethrough.

4. Apparatus as claimed in claim 3, said porous inner bag when inflated being removed from said manifold about 1½ percent to to about 40 percent of diameter of the air bag when inflated.

5. Apparatus as set forth in claim 4, said inner bag when inflated being removed from about 1 inch to about 2 inches from said manifold with 30 inches being the approximate diameter across the air bag when inflated.

6. Apparatus as claimed in claim 1, said porous manifold being comprised of sintered stainless steel.

* * * * *